(12) United States Patent
O'Brien et al.

(10) Patent No.: US 8,032,686 B2
(45) Date of Patent: Oct. 4, 2011

(54) PROTOCOL TRANSLATION IN A DATA STORAGE SYSTEM

(75) Inventors: John Timothy O'Brien, Louisville, CO (US); George F. DeTar, Jr., Longmont, CO (US)

(73) Assignee: Oracle America, Inc., Redwood City, CA (US)

( * ) Notice: Subject to any disclaimer, the term of this patent is extended or adjusted under 35 U.S.C. 154(b) by 0 days.

(21) Appl. No.: 12/433,300

(22) Filed: Apr. 30, 2009

(65) Prior Publication Data

US 2010/0281201 A1 Nov. 4, 2010

(51) Int. Cl.
G06F 13/36 (2006.01)
G06F 13/28 (2006.01)
G06F 15/16 (2006.01)

(52) U.S. Cl. ........... 710/315; 710/22; 710/26; 710/305; 710/308; 709/203; 709/212; 709/213; 370/412; 370/463; 370/466

(58) Field of Classification Search ........... 710/22, 710/26, 305, 308; 709/203, 212, 213
See application file for complete search history.

(56) References Cited

U.S. PATENT DOCUMENTS

| | | | | |
|---|---|---|---|---|
| 6,594,712 B1 * | 7/2003 | Pettey et al. | ............ | 710/22 |
| 6,622,193 B1 * | 9/2003 | Avery | ............ | 710/263 |
| 6,658,521 B1 * | 12/2003 | Biran et al. | ............ | 710/315 |
| 7,293,129 B2 * | 11/2007 | Johnsen et al. | ............ | 710/313 |
| 7,401,126 B2 * | 7/2008 | Pekkala et al. | ............ | 709/217 |
| 7,620,741 B2 * | 11/2009 | Torudbakken et al. | ............ | 710/2 |
| 2008/0059686 A1 * | 3/2008 | Wilkinson | ............ | 710/315 |

OTHER PUBLICATIONS

Non-Volatile Memory Host Controller Interface (NVMHCI) 1.0 Specification; Dated Apr. 14, 2008, 65 pages.*
Mellanox Technologies, "Understanding PCI Bus, PCI-Express and InfiniBand Architecture"; No Date Provided, 10 Pages.*
Mellanox Technologies, "Mellanox InfiniHost, Dual-Port 10Gb/s InfiniBand HCA with PCI-X"; Dated 2006, 2 Pages.*
Mellanox Technologies, "InfiniHost III Ex Dual-Port InfiniBand HCA Cards with PCI Express x8"; Dated 2006, 2 Pages.*
Mellanox Technologies—"Mellanox ConnectX IB, Dual-Port InfiniBand Adapter Cards with PCI Express 2.0"; Dated 2008, 2 Pages.*

* cited by examiner

*Primary Examiner* — Brian Misiura
(74) *Attorney, Agent, or Firm* — Brooks Kushman P.C.

(57) ABSTRACT

A data storage system includes an input/output server and a storage unit. The input/output server includes a processor, memory, and a host channel adapter. The storage unit includes a processor, memory, and a storage module. The storage module includes a storage controller, and an interface block for connecting the storage module to a corresponding memory-mapped interface. The storage unit further includes a host channel adaptor. The storage unit host channel adapter is connected to a corresponding memory-mapped interface. The storage unit host channel adapter is capable of remote direct memory access to the input/output server. Protocol translation logic is configured to intercept a memory access request from the storage controller, and initiate a corresponding remote direct memory access to the input/output server through the storage unit host channel adapter and the input/output server host channel adapter.

10 Claims, 7 Drawing Sheets

PROTOCOL TRANSLATION IN A DATA STORAGE SYSTEM

BACKGROUND OF THE INVENTION

1. Field of the Invention

The invention relates to protocol translation in a data storage system.

2. Background Art

Many computer peripheral devices are designed to attach directly to a computer system by way of a memory-mapped system interface such as PCI-Express. This approach works well for systems consisting of a small number of host processors and their directly-attached peripherals. However, this approach does not scale well to systems consisting of a large number of host processors possibly contained in many separate equipment racks interconnected with a large number of peripheral devices dispersed across multiple equipment racks. Furthermore, it is difficult to construct a fault-tolerant interconnect network among these components using only PCI-Express.

A more flexible and fault-tolerant interconnect technology such as InfiniBand is better suited for connecting a large cluster of computers and their peripherals in such a way that each computer can reach each peripheral device with low access latency and high composite data rate. However, simply attaching a peripheral device that is designed for local attachment using PCI-Express directly to an InfiniBand Host Channel Adapter (HCA) does not allow the computers to communicate with their peripherals because of the major differences between the memory access protocol used by PCI-Express and the Remote Direct Memory Access (RDMA) protocol used by InfiniBand.

What is needed is an efficient means of translating the memory access operations performed by the peripheral device into the RDMA interactions with the InfiniBand HCA that will cause it to carry out these memory access operations across the InfiniBand network.

Currently, the only way for a computer to access a PCI-Express peripheral device that is on the other side of an InfiniBand network is for the computer to communicate with a second computer that is directly connected to the peripheral device by PCI-Express and give the second computer directions to carry out the desired access on behalf of the initiating computer. This process introduces large delays in accessing the peripheral device. Furthermore, to sustain a high access rate using this technique requires the use of a fast (and therefore, expensive) computer that is directly attached to the peripheral device.

SUMMARY OF THE INVENTION

In one embodiment of the invention, an apparatus for use in a data storage system is provided. The apparatus comprises a storage unit including a processor, memory, and a storage module. The storage module includes a storage controller, an interface block for connecting the storage module to a corresponding memory-mapped interface, and protocol translation logic between the storage controller and the interface block. The storage unit further includes a host channel adaptor for connecting the storage unit to an input/output server. The host channel adapter is connected to a corresponding memory-mapped interface. The host channel adapter is capable of remote direct memory access to the input/output server. The protocol translation logic is configured to intercept a memory access request from the storage controller, and initiate a corresponding remote direct memory access to the input/output server through the host channel adapter.

In the illustrated embodiments, the storage controller comprises a non-volatile memory host controller interface (NVMHCI) controller. This type of controller provides an interface that is well suited to transferring data from a host computer to and from non-volatile memory devices such as flash programmable read-only memory (flash PROM). Further, in illustrated embodiments, the interface block connects the storage module to a corresponding PCI-Express interface, the host channel adapter is connected to a corresponding PCI-Express interface, and the host channel adapter is an InfiniBand host channel adaptor. The InfiniBand HCA may be a Mellanox ConnectX HCA. The particular sequences described herein for the illustrated embodiments are specific to the illustrated combination of peripheral device (storage controller) and HCA. The principle can be applied to other devices and other channel adapters, including other HCAs or target channel adapters (TCAs).

In more detail, the protocol translation logic may comprise a circuit connecting the storage controller to the interface block. Further, in the illustrated embodiments, the storage unit processor is programmed to establish a network connection between the host channel adapter of the storage unit and a host channel adapter of the input/output server, and to handle error conditions arising during communications over the network connection involving the protocol translation logic.

In another embodiment of the invention, a data storage system includes an input/output server and a storage unit. The input/output server includes a processor, memory, and a host channel adapter. The storage unit includes a processor, memory, and a storage module. The storage module includes a storage controller, and an interface block for connecting the storage module to a corresponding memory-mapped interface. The storage unit further includes a host channel adaptor. The storage unit host channel adapter is connected to a corresponding memory-mapped interface. The storage unit host channel adapter is capable of remote direct memory access to the input/output server. Protocol translation logic is configured to intercept a memory access request from the storage controller, and initiate a corresponding remote direct memory access to the input/output server through the storage unit host channel adapter and the input/output server host channel adapter.

Embodiments of the invention also comprehend various methods of operating the system. For example, a contemplated method of operating the system comprises establishing a network connection between the host channel adapter of the input/output server and the host channel adapter of the storage unit. The method further comprises intercepting a memory access request from the storage controller, with the protocol translation logic; and initiating, with the protocol translation logic, a corresponding remote direct memory access to the input/output server through the host channel adapter of the storage unit and the host channel adapter of the input/output server.

In a method of command operation in the system, the method comprises establishing a network connection between the host channel adapter of the input/output server and the host channel adapter of the storage unit; writing a command header and associated command table to the memory of the input/output server; and delivering the command header to the protocol translation logic, which stores the command header. The method further comprises reading the command header, by the storage controller, from the protocol translation logic; requesting, from the storage controller, to read, from the memory of the input/output server, a command at the beginning of the command table pointed to by the command header; intercepting the read request from the storage controller, with the protocol translation logic; and initiating, with the protocol translation logic, a corresponding remote direct memory access to the input/output server through the host channel adapter of the storage unit and the host channel adapter of the input/output server.

In a method of write operation in the system, the method comprises establishing a network connection between the host channel adapter of the input/output server and the host channel adapter of the storage unit; receiving, at the storage controller, a write command; and requesting, from the storage controller, to read, from the memory of the input/output server, the write data. The method further comprises intercepting the read request from the storage controller, with the protocol translation logic; and initiating, with the protocol translation logic, a corresponding remote direct memory access to the input/output server through the host channel adapter of the storage unit and the host channel adapter of the input/output server.

In a method of read operation in the system, the method comprises establishing a network connection between the host channel adapter of the input/output server and the host channel adapter of the storage unit; receiving, at the storage controller, a read command; and requesting, from the storage controller, to write, to the memory of the input/output server, the read data. The method further comprises intercepting the write request from the storage controller, with the protocol translation logic; and initiating, with the protocol translation logic, a corresponding remote direct memory access to the input/output server through the host channel adapter of the storage unit and the host channel adapter of the input/output server.

In a method of status operation in the system, the method comprises establishing a network connection between the host channel adapter of the input/output server and the host channel adapter of the storage unit; receiving, at the storage controller, a command; and completing the command, at the storage controller. The method further comprises asserting a storage controller interrupt line, at the storage controller; and in response to the assertion of the storage controller interrupt line, delivering a message to the memory of the input/output server, with the protocol translation logic.

It is appreciated that the invention also comprehends an alternative implementation with external protocol translation logic. In an alternative embodiment, an apparatus for use in a data storage system comprises a storage unit including a processor, memory, and a storage module. The storage module includes a storage controller, and an interface block for connecting the storage module to a corresponding memory-mapped interface. The storage unit further includes a host channel adaptor for connecting the storage unit to an input/output server. The host channel adapter is connected to a corresponding memory-mapped interface. The host channel adapter is capable of remote direct memory access to the input/output server. The apparatus further comprises a protocol translation device including an interface block for connecting to a corresponding memory-mapped interface. The protocol translation device is configured to intercept a memory access request from the storage controller, and initiate a corresponding remote direct memory access to the input/output server through the host channel adapter.

Embodiments of the invention have many advantages. For example, implementing the most time-critical portions of the protocol translation process in circuitry that connects the PCI-Express interface block logic to the rest of the peripheral device yields reduced delays and improved performance when compared to designs that implement the protocol translation external to the peripheral device. Implementing a protocol translation layer in the peripheral device enables the use of an existing design for the remainder of the peripheral device circuitry rather than an entirely new design that directly implements InfiniBand access protocols. It also allows the use of existing InfiniBand HCAs.

Using a PCI-Express attached computer for protocol translation creates additional delays, not only due to the limited speed of the translation computer but also due to the extra PCI-Express transactions between the peripheral device and the translating computer. Eliminating these extra delays reduces peripheral device access latency time. Eliminating the extra PCI-Express transactions increases the amount of data that the PCI-Express interconnect can convey between the host computer and the peripheral device. Employing existing designs for the majority of the peripheral device and of the InfiniBand HCA reduces the cost of developing and testing the complete system.

DETAILED DESCRIPTION OF THE PREFERRED EMBODIMENTS

Figure 1:
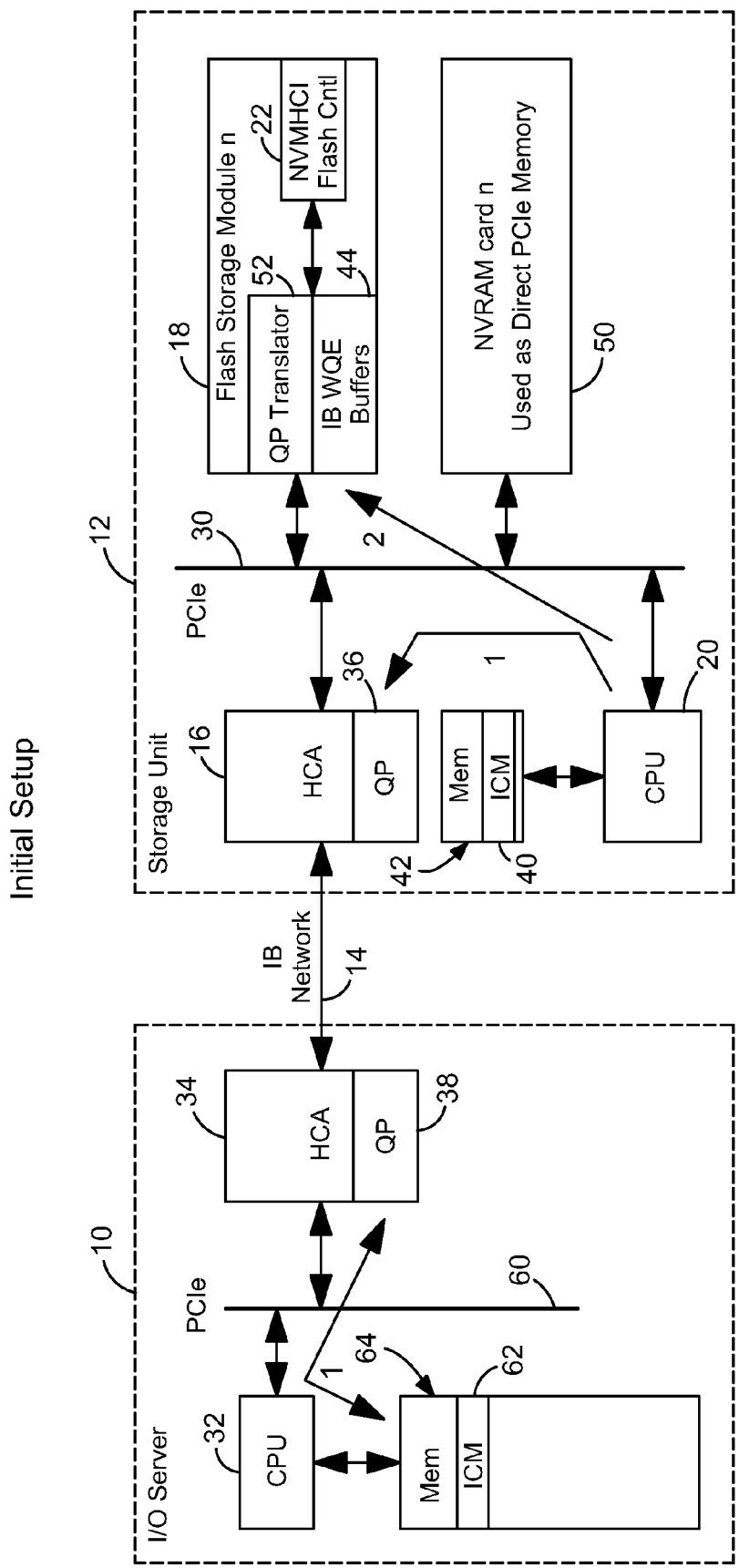
FIG. 1 illustrates initial setup in a system employing protocol translation in an embodiment of the invention.

FIGS. 1-7 illustrate the major components of a system employing protocol translation in an embodiment of the invention. The system includes a host computer (I/O server) 10 attached to a storage unit 12 through an InfiniBand network 14. The storage unit 12 contains an InfiniBand host channel adaptor (HCA) 16, a flash storage module 18, and a peripheral device management computer (CPU) 20. Within the flash storage module 18, there is an NVMHCI flash controller 22 that communicates over the PCI-Express interconnect 30, here shown as a logical multiple drop bus rather than a switched fabric for simplicity, by interacting with the protocol translation logic that is implemented in accordance with an embodiment of the invention which, in turn, connects to a PCI-Express interface block. The division between the protocol translation logic and the PCI-Express interface block is not specifically shown in FIGS. 1-5, but is shown in detail in FIGS. 6-7.

FIG. 1 illustrates initial setup in a system employing protocol translation in an embodiment of the invention.

1) Both CPUs 20, 32 set up the HCAs 16, 34 to establish and open queue pairs 36, 38 to each other. Several queue pairs 36, 38 are used for enclosure services, error handling, non-volatile RAM (NVRAM) access and flash access.

2) Storage unit CPU 20 sets up flash storage module(s) 18. Each queue pair translator 52 is made aware of its queue addresses. CPU 20 also sets up in the CPU local memory 42 the data structures used by the HCA 16.

Storage unit CPU 20 will handle enclosure service operations and step in to handle error cases. The overall context information for the entire storage unit (the Interconnect Context Memory or ICM 40) resides in the storage unit processor's memory 42. When the storage unit processor 20 establishes the queue pairs for a flash storage module 18, CPU 20 specifies the addresses of the work queue entry buffers 44. These buffers 44 reside within the flash storage module 18.

Also illustrated in FIG. 1, in the storage unit 12, is an NVRAM card 50 which is used as direct access PCI-Express memory. As well, flash storage module 18 includes queue pair translator 52, further described below. In I/O server 10, the PCI-Express interconnect is shown at 60. Further, the overall context information (the Interconnect Context Memory or ICM 62) resides in the I/O server processor's memory 64.

Figure 2:
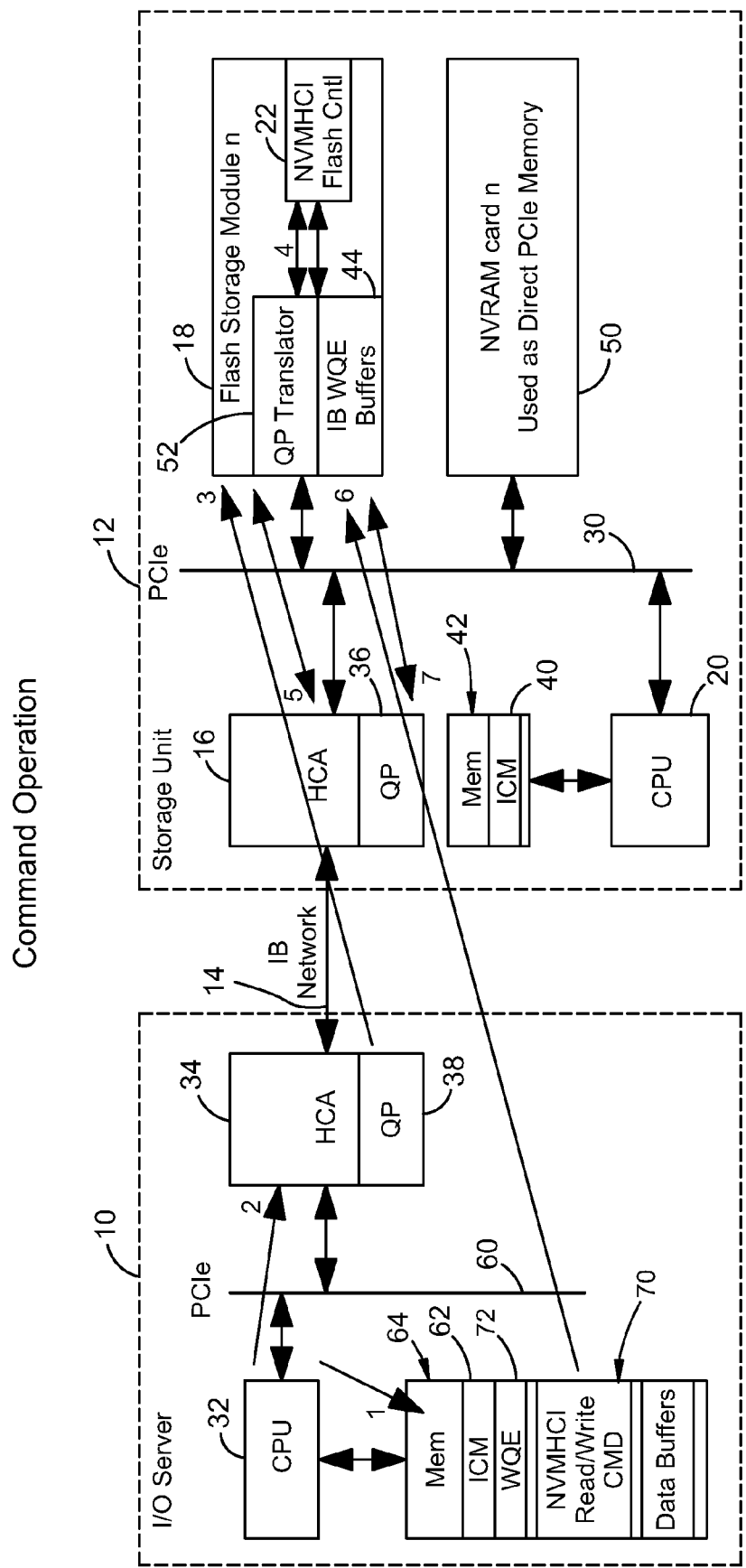
FIG. 2 illustrates command operation in the system.

FIG. 2 illustrates command operation in the system.

1) CPU 32 writes into its local memory 64 an NVMHCI command header 70 and associated command table containing a write or read command, scatter-gather list and metadata region. CPU 32 then writes into its local memory 64 an IB send queue work queue entry 72 specifying an RDMA-write operation to transfer the 32-byte command header to the QP translator 52.

2) CPU 32 writes to the HCA's doorbell page for the associated queue pair 38 notifying the queue pair 38 of a new entry in the send queue.

3) The server and storage unit HCAs 34, 16 deliver the command header to the QP translator 52, which stores the command header in the command list structure in the QP translator 52.

4) The QP translator 52 responds to the write of the command header into the command list structure by setting the appropriate commands issued bit in the command issue register in the NVMHCI port. The NVMHCI controller 22 within the flash storage module 18 reads the NVMHCI command header from the command list structure in the QP translator 52.

5) The NVMHCI controller 22 issues a request to read from I/O server memory 64 the NVMHCI command at the beginning of the NVMHCI command table pointed to by the NVMHCI command header. The QP translator logic 52 intercepts this request and generates an RDMA Read work queue entry (WQE) 44 and rings the doorbell in the HCA 16. The IB HCA 16 reads the WQE from the QP translator 52.

6) The HCAs 16, 34 read the NVMHCI command from I/O server memory 64 and write it to the QP translator 52, satisfying the read request that was issued by the NVMHCI controller 22. The destination address that the QP translator 52 put into the RDMA Read WQE specified which outstanding read request the data is for.

7) The HCA 16 reads the completion queue doorbell record from the QP translator 52. The QP translator 52 snoops the HCA write of the completion queue entry describing the success/failure of the operation and updates its CQ doorbell record.

8) In the same fashion, the NVMHCI controller 22 reads the remaining command table fields from I/O server memory 64.

Figure 3:
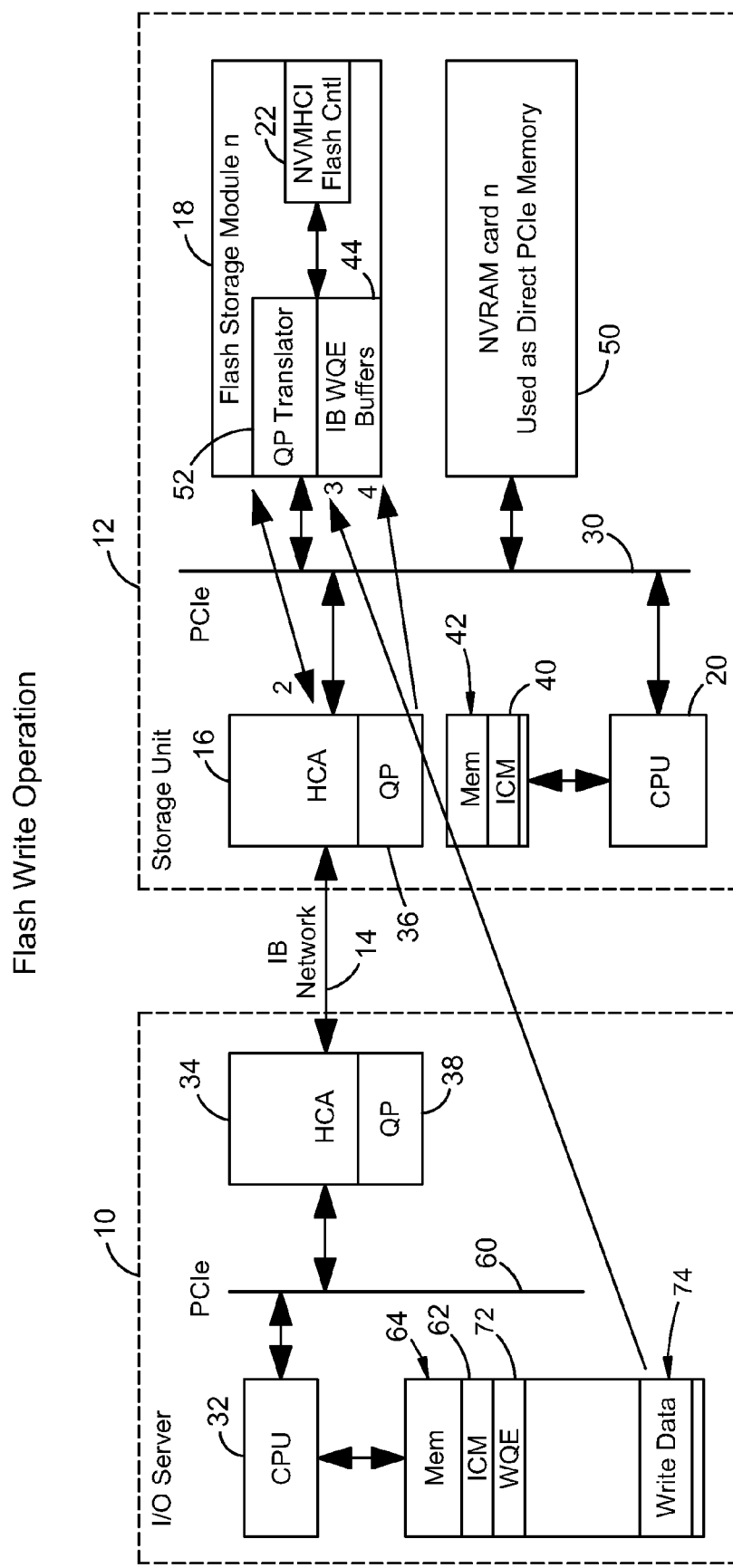
FIG. 3 illustrates flash write operation in the system.

FIG. 3 illustrates flash write operation in the system.

1) The NVMHCI write command is received from the server, in the manner described above for command operation (FIG. 2).

2) The NVMHCI controller 22 within the flash storage module 18 issues a request to read the data from the CPU's memory. The QP translator logic 52 intercepts this and generates an RDMA Read WQE 44 and rings the doorbell in the HCA 16. The IB HCA 16 reads the WQE from the QP translator 52.

3) The HCAs 16, 34 read the write data 74 from I/O server memory 64 and write the data 74 to the QP translator 52, satisfying the read data request that was issued by the NVM-HCI controller 22. The destination address that the QP translator 52 put into the RDMA Read WQE specified which outstanding read request the data is for.

4) The HCA 16 reads the completion queue doorbell record from the QP translator 52. The QP translator 52 snoops the HCA write of the completion queue entry describing the success/failure of the operation. The QP translator 52 updates its CQ doorbell record.

Figure 5:
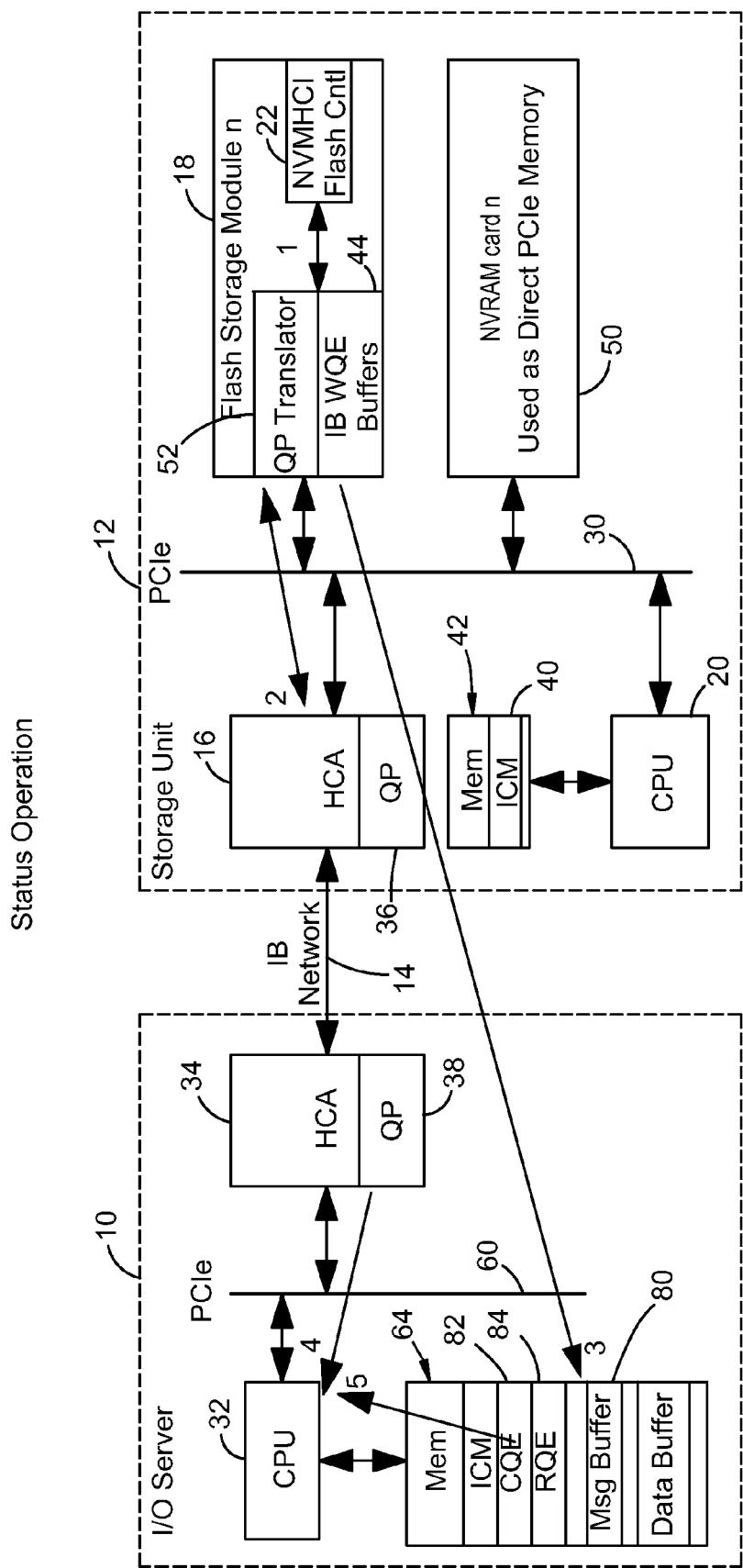
FIG. 5 illustrates status operation in the system.

5) NVMHCI status is returned to the server, in the manner described below for status operation (FIG. 5).

Figure 4:
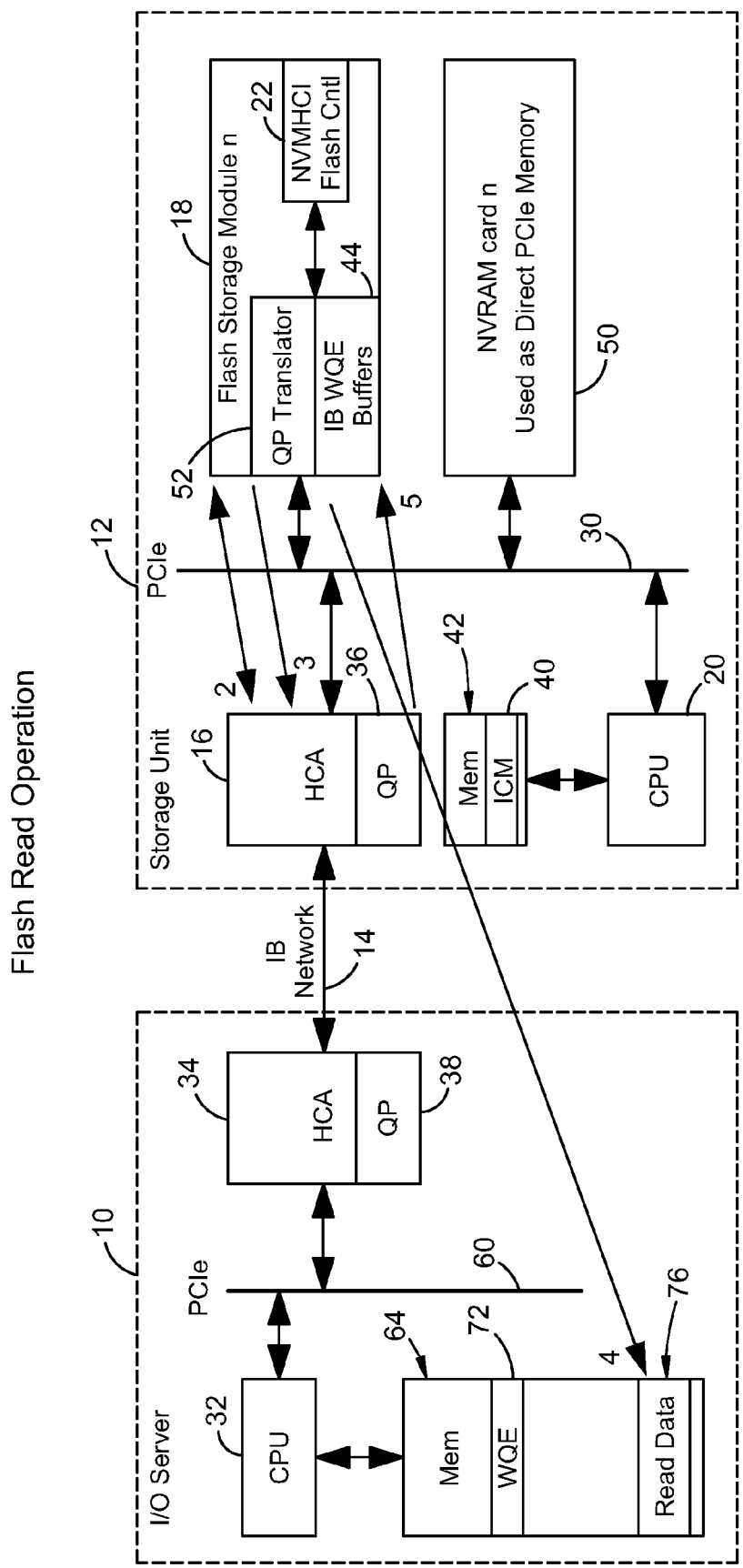
FIG. 4 illustrates flash read operation in the system.

FIG. 4 illustrates flash read operation in the system.

1) The NVMHCI read command is received from the server, in the manner described above for command operation (FIG. 2).

2) The NVMHCI controller 22 issues a request to write data into I/O server memory 64. The QP translator logic 52 intercepts this and generates an RDMA Write WQE 44 and rings the doorbell in the HCA 16. RDMA transfers are performed in the order they were requested, so the source data for this RDMA Write operation will appear on the NVMHCI controller's outbound write channel as soon as any prior RDMA Write operations that are still in progress have completed.

3) The IB HCA 16 reads the WQE from the QP translator 52.

4) The HCA 16 reads the data from the QP translator 52 (which the QP translator 52 receives by unblocking the NVMHCI controller's outbound write channel) and transfers the data 76 to I/O server memory 64, satisfying the write request that was issued by the NVMHCI controller 22.

5) The HCA 16 reads the completion queue doorbell record from the QP translator 52. The QP translator 52 snoops the HCA write of the completion queue entry describing the success/failure of the operation. The QP translator 52 updates its CQ doorbell record.

6) NVMHCI status is returned to the server, in the manner described below for status operation (FIG. 5).

FIG. 5 illustrates status operation in the system.

1) When the NVMHCI controller 22 completes a command, it writes a word of completion status into the command status field of the command header of the command that completed. (There are 32 command headers contained in the 1024-byte command list structure within the QP translator 52.) The NVMHCI controller 22 then asserts its interrupt line, causing the QP translator logic 52 to begin the process of sending an interrupt message to the I/O server 10.

2) The QP translator logic 52 reads the interrupt status register from the NVMHCI controller portion 22 of the flash storage module 18. If the command completion status bit is the only bit set, the QP translator logic 52 writes 1 to the command completion status bit in the interrupt status register to clear the interrupt. The QP translator logic 52 then reads the command issue register and determines that the command has now completed. The QP translator logic 52 generates a send WQE, with the source address of the message pointing to a block of QP translator hardware addresses that contain the identity of the command that completed and the command status field of the command header of the command that completed. The QP translator 52 rings the doorbell in the HCA 16. The IB HCA 16 reads the WQE from the QP translator 52.

3) The HCAs 16, 34 deliver the message containing the command identification and the command status to the message buffer 80 in the I/O server's local memory 64 as specified by the next receive queue entry on this queue pair's receive queue 38.

4) If the completion queue interrupt is enabled, the I/O server HCA 34 interrupts the I/O server CPU 32.

5) The CPU 32 reads the completion queue entry 82, the receive WQE 84 and the message stored in the message buffer 80. The CPU recognizes the command that completed, reads the status for the completed command from the message buffer 80 in its local memory 64 and informs the code that initiated the command that the command has completed.

Figure 6:
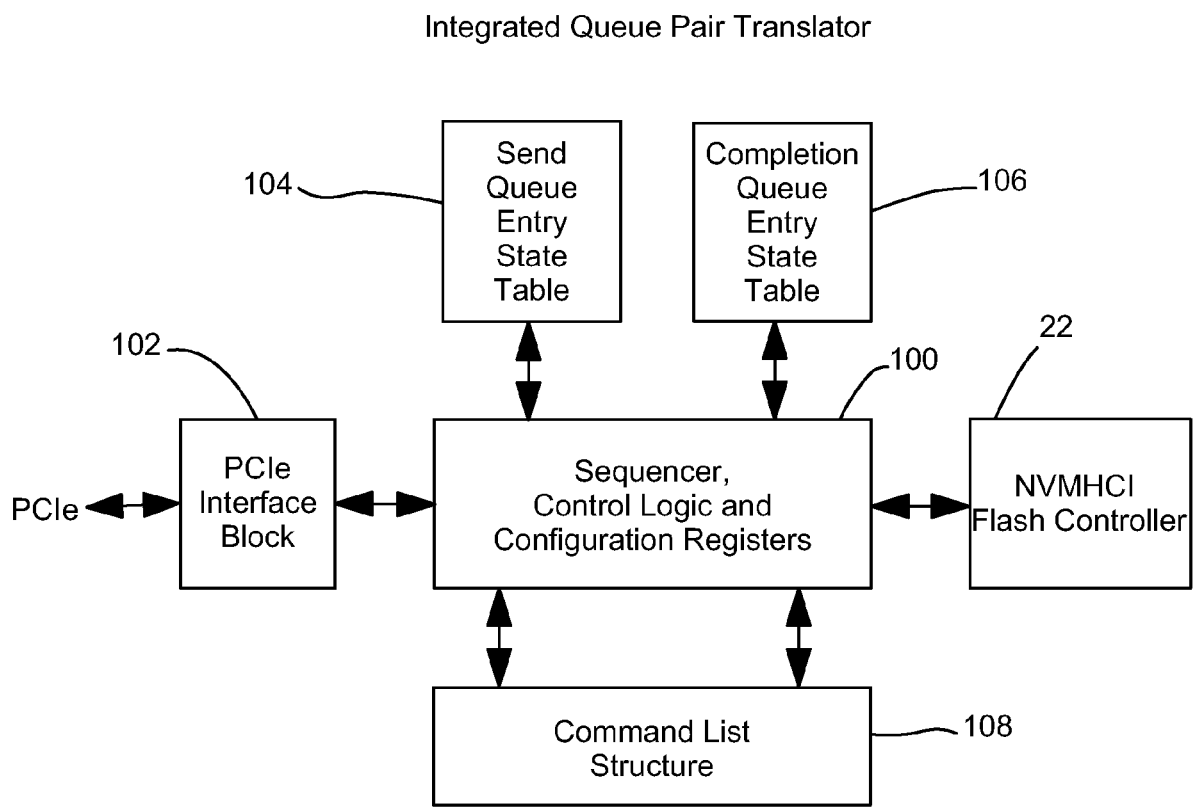
FIG. 6 illustrates an integrated queue pair translator in the system.

FIG. 6 illustrates an integrated queue pair translator in the system.

The sequence and control logic 100 intercepts memory access requests coming from the NVMHCI controller 22 and generates the appropriate sequences to initiate an RDMA transfer through the InfiniBand HCA. In response, the HCA accesses send queue work queue entries (WQEs) and completion queue WQEs. When the HCA reads a send queue WQE, the sequence and control logic 100 receives the read request from the PCIe interface block 102 and uses the information stored in the send queue entry state table 104 to synthesize the data content of the work queue entry. The completion queue entry state table 106 holds the completion queue WQEs written by the HCA through the PCIe interface block 102. The queue entry state tables 104, 106 also hold the state information that the sequence and control logic 100 uses as it progresses through the steps of each memory access operation.

In response to a PCIe write to one or more command headers in the command list structure 108, the sequence and control logic 100 accesses registers in the NVMHCI controller 22 to initiate command processing. In response to an interrupt request from the NVMHCI controller 22, the sequence and control logic 100 accesses registers in the NVMHCI controller 22 and generates appropriate sequences to initiate a send operation through the InfiniBand HCA, transmitting command status values that the NVMHCI controller 22 wrote into the command header(s) in the command list structure 108.

To carry out these operations, the sequence and control logic 100 intercepts memory access requests coming from the PCIe interface block 102 and responds to the request according to the range of memory addresses being accessed. The sequence and control logic 100 handles work queue accesses by analyzing the data being written and by synthesizing the data being read. It handles accesses to the data being transferred in response to an NVMHCI controller request by moving data directly to/from the NVMHCI controller 22. It handles NVMHCI controller register accesses by passing the access request to the NVMHCI controller 22.

Figure 7:
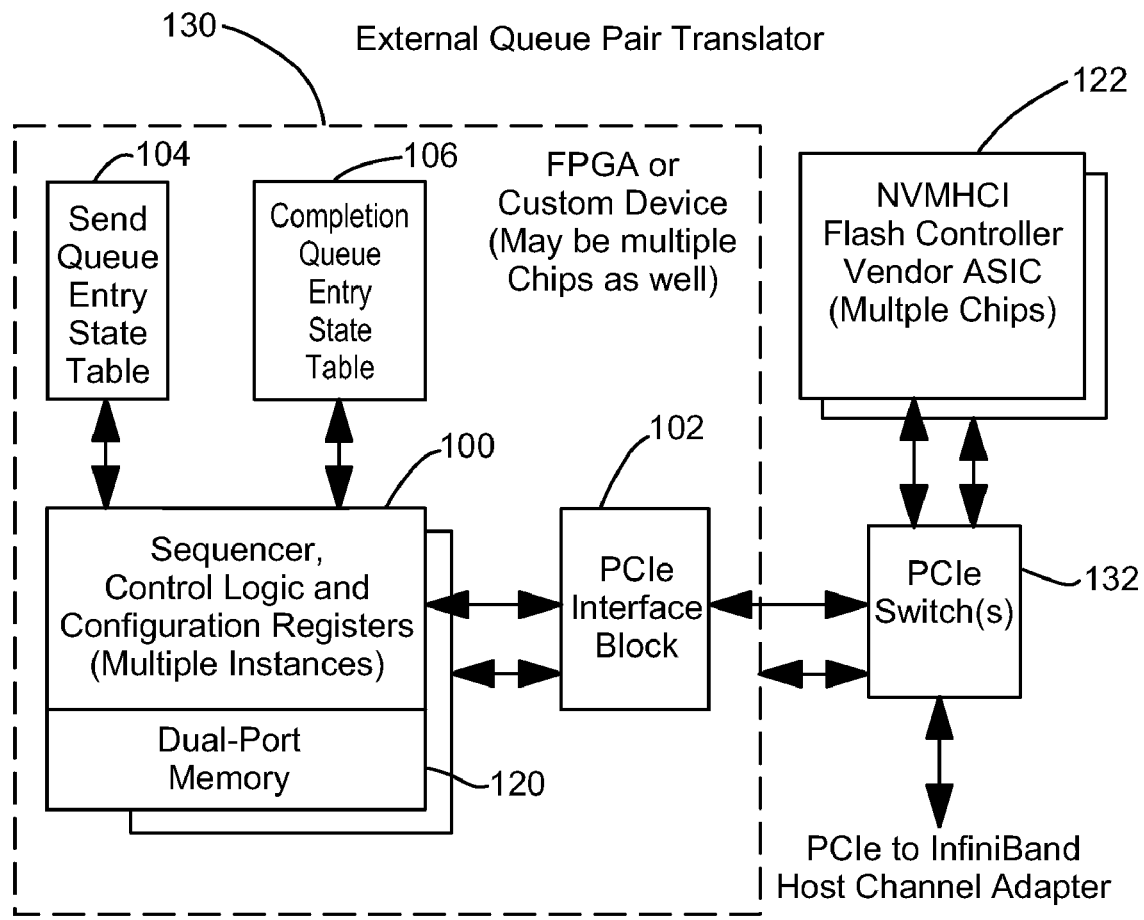
FIG. 7 illustrates an external queue pair translator in an alternative implementation of the system.

FIG. 7 illustrates an external queue pair translator in an alternative implementation of the system.

This is an alternate approach for queue pair translation if the NVMHCI controller 122 is a separate PCIe device, one that communicates with the queue pair translator 100 via PCIe. In this implementation, the QP translator 100 does not intercept accesses from the NVMHCI controller 122 before they go through the PCIe interface block to the PCIe fabric but instead is assigned a range of addresses in PCI-Express memory space. QP translator 100 may also be shared between multiple NVMHCI controllers 122.

The dual-port memory 120 must be large enough to buffer data blocks being written by the NVMHCI controller 122. When the NVMHCI controller 122 generates a PCI-Express transaction to write data into the I/O server's memory, the QP translator logic 100 intercepts the transaction, generates an RDMA write WQE and rings the doorbell in the HCA. Meanwhile, the QP translator logic 100 buffers the write data contained in the PCI Express transaction by writing the data into the dual-port memory 120. The source address in the RDMA write WQE is the address of the dual-port memory 120 buffer holding the data.

However, apart from the fact that it connects to the NVMHCI controller through the PCI-Express fabric rather than directly and the corresponding requirement for additional buffering, queue pair translation works the same as for the embedded version.

If multiple NVMHCI controller ports are used then the FPGA 130 could have multiple instances of QP translators 100 to support each NVMHCI controller port 122. There may be limitations on bandwidth that would require balancing the number of separate QP translators and/or PCI-Express switch devices 132 to meet system performance requirements.

It can also be noted that it is a design choice driven by a cost/bandwidth tradeoff whether the PCI-Express interface block on the standalone queue pair device used to communicate with the NVMHCI controllers is the same or different than the one used to communicate with the HCA.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A data storage system comprising:
   an input/output server including a processor, memory, and a host channel adapter;
   a storage unit including a processor, memory, and a storage module;
   the storage module including a storage controller, and an interface block for connecting the storage module to a corresponding memory-mapped interface;
   the storage unit further including a host channel adaptor for connecting the storage unit to the input/output server, the storage unit host channel adapter being connected to a corresponding memory-mapped interface, the storage unit host channel adapter being capable of remote direct memory access to the input/output server; and
   protocol translation logic configured to intercept a memory access request from the storage controller, and initiate a corresponding remote direct memory access to the input/output server through the storage unit host channel adapter and the input/output server host channel adapter;
   wherein the data storage system is configured to:
   establish a network connection between the host channel adapter of the input/output server and the host channel adapter of the storage unit;
   write a command header and associated command table to the memory of the input/output server;
   deliver the command header to the protocol translation logic, which stores the command header;
   read the command header, by the storage controller, from the protocol translation logic;
   request, from the storage controller, to read, from the memory of the input/output server, a command at the beginning of the command table pointed to by the command header;
   intercept the read request from the storage controller, with the protocol translation logic; and
   initiate, with the protocol translation logic, a corresponding remote direct memory access to the input/output server through the host channel adapter of the storage unit and the host channel adapter of the input/output server.

2. The system of claim 1 wherein the storage controller comprises a non-volatile memory host controller interface (NVMHCI) controller.

3. The system of claim 1 wherein the interface block connects the storage module to a corresponding PCI-Express interface.

4. The system of claim 1 wherein the host channel adapter of the storage unit is connected to a corresponding PCI-Express interface.

5. The system of claim 1 wherein the host channel adapter of the storage unit is an InfiniBand host channel adaptor.

6. The system of claim 1 wherein the protocol translation logic comprises a circuit connecting the storage controller to the interface block.

7. The system of claim 1 wherein the protocol translation logic comprises a protocol translation device including an interface block for connecting to a corresponding memory-mapped interface.

8. The system of claim 1 wherein the data storage system is further configured to:
   receive, at the storage controller, a write command;
   request, from the storage controller, to read, from the memory of the input/output server, the write data;
   intercept the read request from the storage controller, with the protocol translation logic; and
   initiate, with the protocol translation logic, a corresponding remote direct memory access to the input/output server through the host channel adapter of the storage unit and the host channel adapter of the input/output server.

9. The system of claim 1 wherein the data storage system is further configured to:
   receive, at the storage controller, a read command;
   request, from the storage controller, to write, from the memory of the input/output server, the read data;
   intercept the write request from the storage controller, with the protocol translation logic; and
   initiate, with the protocol translation logic, a corresponding remote direct memory access to the input/output server through the host channel adapter of the storage unit and the host channel adapter of the input/output server.

10. A data storage system comprising:
   an input/output server including a processor, memory, and a host channel adapter;
   a storage unit including a processor, memory, and a storage module;
   the storage module including a storage controller, and an interface block for connecting the storage module to a corresponding memory-mapped interface;
   the storage unit further including a host channel adaptor for connecting the storage unit to the input/output server, the storage unit host channel adapter being connected to a corresponding memory-mapped interface, the storage unit host channel adapter being capable of remote direct memory access to the input/output server; and
   protocol translation logic configured to intercept a memory access request from the storage controller, and initiate a corresponding remote direct memory access to the input/output server through the storage unit host channel adapter and the input/output server host channel adapter;
   wherein the data storage system is configured to:
   establish a network connection between the host channel adapter of the input/output server and the host channel adapter of the storage unit;
   receive, at the storage controller, a command;
   complete the command, at the storage controller;
   assert a storage controller interrupt line, at the storage controller; and
   in response to the assertion of the storage controller interrupt line, delivering a message to the memory of the input/output server, with the protocol translation logic.

* * * * *